March 21, 1950            A. WIKKERINK            2,501,557
ROLLING JOINTER
Filed March 3, 1945                                                        2 Sheets-Sheet 1
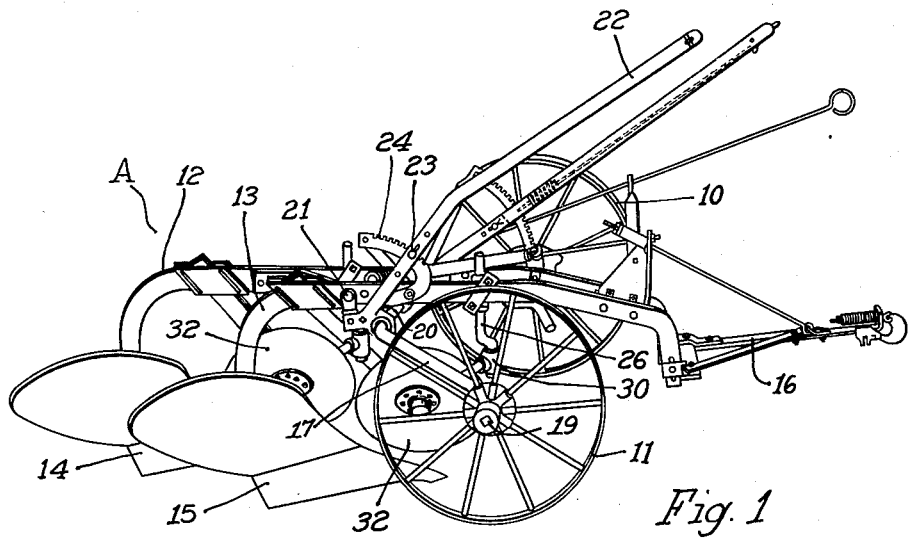
Inventor
Arnold Wikkerink
By Robert M. Dunning
Attorney March 21, 1950 — A. WIKKERINK — 2,501,557
ROLLING JOINTER
Filed March 3, 1945 — 2 Sheets-Sheet 2

Inventor
Arnold Wikkerink
By Robert M. Dunning
Attorney

Patented Mar. 21, 1950

2,501,557

UNITED STATES PATENT OFFICE 2,501,557

ROLLING JOINTER

Arnold Wikkerink, Baldwin, Wis.

Application March 3, 1945, Serial No. 580,833

3 Claims. (Cl. 97—209)

My invention relates to an improvement in rolling jointer wherein it is desired to provide an apparatus for plowing ground.

Jointers are generally of two types; a jointer blade beside a rolling colter; or a jointer blade mounted stationary in front of the plow mold board above the plowshare. The first type is most successful, but difficulty is experienced in keeping the jointer blade against the side of the colter blade to prevent grasses and earth from collecting between the colter blade and the jointer blade and thus handicapping the proper functioning of the plow. If the tip of the jointer blade is placed too close to the rolling colter it will cut the rolling colter blade, and if too far away, grass will clog between it and the colter causing unnecessary friction and wear. The latter type has difficulty with rocks clogging between the point of the jointer and plowshare. Furthermore, this type of construction has the disadvantage of not being able to cut tough grass or corn stalks which lie loose on the ground.

In order to obviate the former difficulties I provide a plow mounted in the usual manner, but having in place of the colter ordinarily used a disc blade. This disc is positioned in approximately the same location usually occupied by the colter blade and acts to break the ground forwardly of the mold board. At the same time, however, the disc serves the additional purpose of turning a furrow ahead of the mold board so that the earth may be first turned over to some extent by the rolling jointer and then turned over in a larger furrow by the plowshare and mold board. Thus I accomplish all of the favorable results accomplished by the use of a rolling colter and jointer blade in advance of the plowshare without any of the disadvantageous features thereof.

A feature of the present invention lies in the provision of a pivotally supported disc in advance of a plow mold board and in holding the disc resiliently in its proper position. It is desirable that the disc be able to swing about the vertical axis of its support, but it is particularly desirable when the disc strikes a large rock or the like. It is also necessary to hold the disc in proper relation to the plowshare in order that it may serve its desired purpose. In order to accomplish the desired result I provide a spring means which engages the disc or disc support and acts to hold the same in proper relation to the plowshare and mold board.

A feature of the present invention resides in making the spring means holding the disc in its proper position adjustable. As a result it is possible for me to properly position the disc relative to the plowshare so that the disc will cut into the ground along a substantially vertical line which is forwardly aligned with the plowshare and mold board or slightly outwardly thereof.

These and other objects and novel features of my invention will be more clearly and fully set forth in the following specification and claims.

In the drawings forming a part of my specification:

Figure 1 is a perspective view of a gang plow incorporating my invention.

Figure 2 is a perspective view showing the relationship between the rolling jointer and the plowshare.

Figures 3, 4, 5:
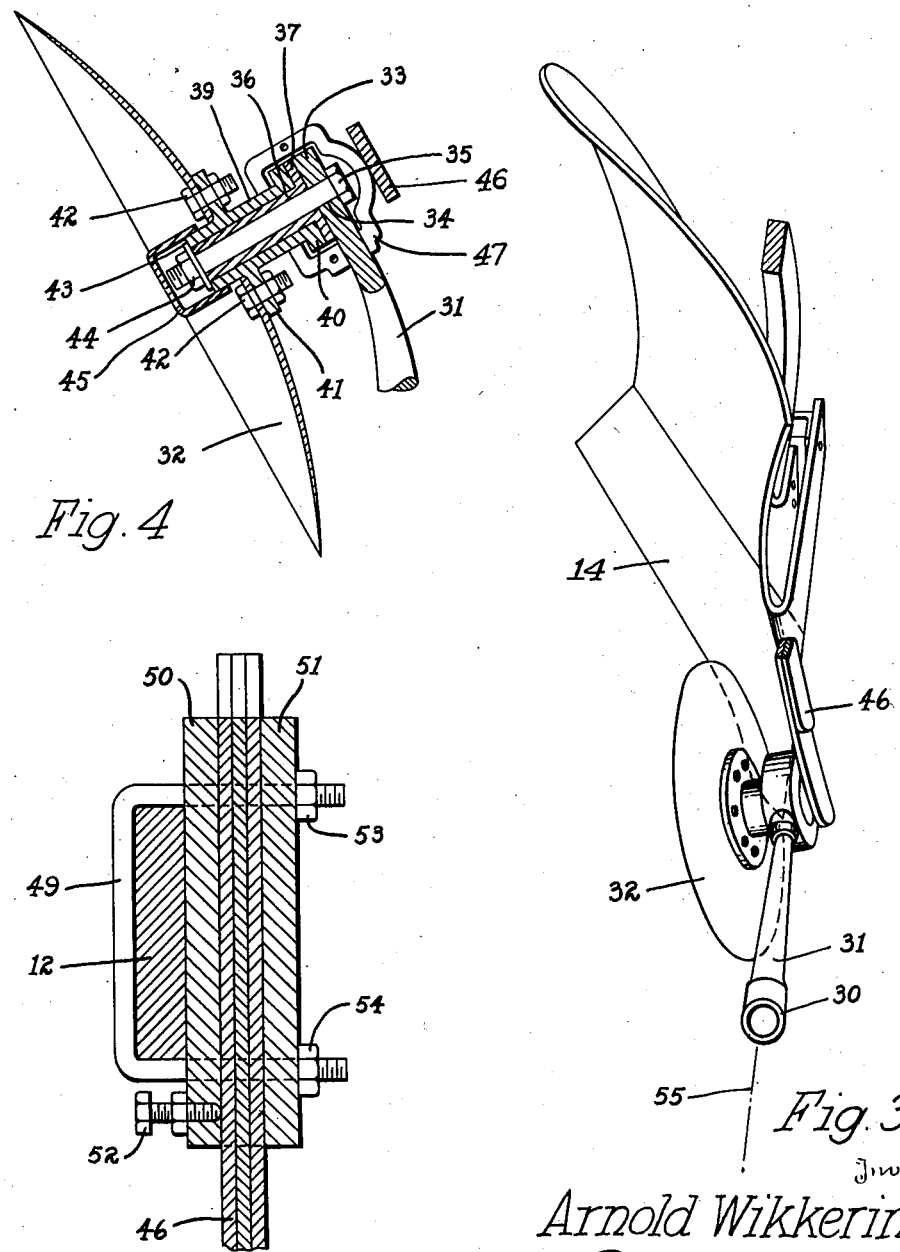
Figure 3 is a diagrammatic top plan view showing the relationship between the rolling jointer and the plowshare.
Figure 4 is a horizontal section through the rolling jointer showing the detail construction of the support therefor.
Figure 5 is a section on the line 5—5 of Figure 2 showing the adjustment of the spring supporting the rolling jointer.

The gang plow illustrated in general by the letter A is of any desired construction and includes a frame supported by a pair of spaced wheels 10 and 11. The frame includes the parallel plow beams 12 and 13 which support the plowshares 14 and 15 respectively. A hitch 16 is provided at the forward end of the beams and this hitch is provided with suitable adjusting mechanisms.

The wheels 10 and 11 are supported in any suitable manner as by connected arms 17. The wheels are supported on spindles 19 at the ends of the arms 17 and the arms are supported by, or form a part of, a transverse shaft secured to the brackets 20 which are pivotally secured to the frame at 21. An operating lever 22 is connected to the brackets 20 and the height of the plow frame relative to the ground may be regulated by means of this lever 22. A catch 23 of suitable construction is engageable in a gear segment 24 to hold the lever in adjusted position.

All of the foregoing mechanism is common to gang plows and forms no part of the present invention. Any suitable frame and beam construction may be employed for the applicant's purpose.

Secured in any suitable manner to each of the beams 12 and 13 I provide a vertical bearing 25. In each such vertical bearing 25 I provide an off-set shank 26 such as may be used for supporting a colter or the like. This shank 26 is secured from rotation in the bearing 25 by any suitable means such as by the set screw 27 and the shank may be rotated angularly within the bearing. This shank 26 is secured from rotation in the bearing 25 by any suitable means such as by the set screw 27 and the shank may be rotated angularly within the bearing. This shank is provided with an off-set end 29 which is parallel to the upper portion 26 of the shank, but is off-set from the axis thereof. As a result the rotation of the shank 26 in its bearing 25 will adjust the position of the lower end of the shank. A sleeve 30 is rotatably supported upon the lower end 29 of the shank 26 and this sleeve 30 supports an arm 31 which extends downwardly and rearwardly from the sleeve 30. This arm 31 acts to support a disc blade 32 through the bearing structure best illustrated in Figure 4 of the drawings.

The end 33 of the arm 31 is flattened and drilled at 34 to accommodate a spindle bolt 35. A bearing 36 encircles the spindle 35 and is provided with a flange 37 designed to engage against the flattened end 33 of the arm 31. A sleeve 39 is rotatably supported on the bearing 36, this sleeve 39 having an end flange 40 which engages against the flange 37. The engagement between the flanges 37 and 40 provides a thrust bearing to take up end thrust exerted upon the sleeve 39.

The sleeve 39 is also provided with a circumferential flange 41 which is secured by bolts 42 or any suitable means to the disc blade 32. The disc 32 is concave so as to turn a furrow as it travels through the ground.

A washer 43 and nut 44 are provided on the spindle bolt 35 so as to hold the various parts in assembled relation. A cap 45 extends over the bolt and nut 44 and is secured to the end of the sleeve 39 to prevent dirt from entering the bearing. A housing 46 is also secured to the arm 31 in a manner to enclose a part of the sleeve 39, the flanges 37 and 40, the end 33 of the arm 31, and the spindle bolt head. The housing 46 is split and the two halves thereof assembled over the enclosed elements and held in place by bolts.

A spring 46 is supported by each beam 12 and 13 near the curved rear ends thereof. Each spring 46 is secured to its adjacent beam by means of a pair of U bolts 49 which engage over the beam and extend through a pair of plates 50 and 51 arranged on opposite sides of the spring 46. The U bolts 49 prevent the spring 46 from twisting relative to the plates and relative to the beam 12 or 13 to which it is attached. However, the U bolts do not extend through the spring, but rather engage against opposite edges thereof.

The spring 46 is designed to engage against the support for each disc 32. The spring is shown as engaging the external surface of the housing 46 so as to hold the disc 32 in its proper position. There is considerable strain upon the disc tending to push the same laterally, but this strain is resisted by the tension of the spring 46. On the other hand, should either disc 32 strike an immovable object the spring 46 would permit pivotal movement thereof.

In order to adjust the tension of the spring 46 I provide a set screw 52 which extends through the plate 50 and engages against the surface of the spring 46 near the bottom of the plate. By loosening the nuts 53 and 54 of the U bolts 49 the spring 46 may be forced by the set screw 52 away from the lower end of the plate 50. The nuts 53 and 54 may then be tightened until the spring is securely clamped. In practice it is ordinarily necessary only to loosen the nuts 54 which clamp the lower end of the spring 46 before tightening the screw in the set screw 52. Although it is sometimes advisable to loosen the upper nuts 53 slightly to take care of the angularity between the plates 50 and 51.

In operation the rolling jointer 32 is supported so that the part of the disc cutting into the earth on the convex side thereof is substantially a vertical line directly above and forwardly from the point of the adjacent plowshare. In order to insure the fact that the disc 32 is not inwardly of the straight edge of the plowshare, it is often preferable that the disc 32 be located a fraction of an inch or so outwardly from the straight side of the plowshare. For example if the broken line 55 in Figure 3 of the drawings shows the direction of travel of the plowshare the disc 32 at the point cutting into the earth may extend slightly to the right of the line 55 as viewed in Figure 3.

As will be recognized, it is necessary that each disc blade 32 be arranged with its axis at an angle to the transverse axis of the plow. This is necessary in order that the concave shape of the disc may turn the furrow as the disc moves through the earth. It is also necessary that the axis of the disc be inclined at an angle to the horizontal with the concave surface of the disc directed downwardly at an angle toward the earth, while the concave surface of the disc is directed upwardly at a slant from the earth. This double slant of the rolling jointer consisting of a disc blade permits the forward edge of the disc cutting into the earth to be substantially vertical so as to cut the earth, leaving a vertical line on the side contacted by the convex surface of the disc and turning a furrow on the concave side of the disc. This vertical cut edge should be in alignment with the vertical wall cut by the flat side of the plowshare, or should be slightly spaced from the vertical wall left by the flat side of the plowshare.

The position of the rolling jointer relative to the plowshare may be just adjusted by means of the offset shank 26 and the tension of the spring 46 may be adjusted as was described by the set screw 52. Thus the discs 32 may be arranged to cut into the earth in proper relation to the plowshare behind the same.

My combination has proved superior in operation to the same gang plow employing a rolling colter and jointer blade combination. Furthermore, much less time has been required to use the rolling jointer described than to use the same plow with conventional colter attachments. The reason for the great saving in time lies in the fact that the construction illustrated obviates the chance of grass and the like wedging between the blade and the colter disc to stop operation thereof.

My combination is much more economical than the usual plow equipped with conventional colter attachments because of the fact that the rolling jointers are not engaged by a blade which cuts into the disc causing excess wear thereof.

In accordance with the patent statutes, I have described the principles of construction and operation of my rolling jointer, and while I have endeavored to set forth the best embodiments thereof, I desire to have it understood that obvious changes may be made within the scope of the following claims without departing from the spirit of my invention.

I claim:

1. In combination with a plow having a plowshare and mold board and a beam therefor, a shank extending downwardly from said beam forwardly from said plowshare, means securing said shank in adjusted position, an arm pivotally secured to said shank on a generally vertical pivot, a concave disc rotatably secured in fixed relation to said arm and supported thereby forwardly from said plowshare and somewhat above the level thereof, said disc being positioned so that the concave side thereof and the plowshare and mold board will turn furrows in the same direction, said disc and its arm being free to rotate about said vertical pivot in the direction of the concave side of said disc, rotation of said arm about said pivot increasing the distance between the plow-share and said disc, and means on said plow beam resiliently resisting pivotal movement of said arm and disc in the direction toward the convex side of said disc.

2. In combination with a plow having a plowshare and mold board and a beam therefor, an offset shank extending downwardly from said beam forwardly from said plowshare, means securing said shank in adjusted position, an arm pivotally secured to said shank on a generally vertical pivot, a concave disc secured to said arm and supported thereby forwardly from said plowshare and somewhat above the level thereof, said disc being positioned so that the concave side thereof and the plowshare and mold board will turn furrows in the same direction, said disc and its arm being free to rotate about said vertical pivot in the direction of the concave side of said disc, and flat spring means on said plow beam resiliently engaging said arm to resist pivotal movement of said arm and disc in the opposite direction.

3. In combination with a plow having a plowshare and mold board and a beam therefor, a shank extending downwardly from said beam forwardly from said plowshare, means securing said shank in adjusted position, an arm pivotally secured to said shank on a generally vertical pivot, a concave disc secured to said arm and supported thereby forwardly from said plowshare and somewhat above the level thereof, said disc being positioned so that the concave side thereof and the plowshare and mold board will turn furrows in the same direction, said disc and its arm being free to rotate about said vertical pivot in the direction of the concave side of said disc, the axis of the disc being tilted at an angle to the horizontal and the rear edge of the disc being offset laterally from the line of travel of the forward edge of the disc, and means on said plow beam resiliently engaging said arm at a point substantially aligned with the axis of the disc and resisting rotation of said arm and disc in the direction toward the convex side of the disc.

ARNOLD WIKKERINK.

REFERENCES CITED

The following references are of record in the file of this patent:

UNITED STATES PATENTS

| Number | Name | Date |
|---|---|---|
| 984,103 | Paul | Feb. 14, 1911 |
| 1,103,101 | Thompson | July 14, 1914 |
| 1,228,695 | Ogle | June 5, 1917 |
| 1,413,709 | Doffing | Apr. 25, 1922 |
| 1,425,451 | Conti | Aug. 8, 1922 |
| 1,732,885 | Gilson | Oct. 22, 1929 |
| 2,210,813 | Kriplean | Aug. 6, 1940 |
| 2,244,774 | Hewitt | June 10, 1941 |